(12) United States Patent
Pronold (10) Patent No.: US 9,111,002 B2
(45) Date of Patent: Aug. 18, 2015

(54) METHOD FOR READING IN A TWO-DIMENSIONAL PATTERN CODE AND FOR REPRESENTING AND USING DATA, A MOBILE DEVICE FOR CARRYING OUT THE METHOD, AND A METHOD FOR CREATING A TWO-DIMENSIONAL PATTERN CODE

(75) Inventor: Timo Pronold, Regensburg (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/353,563

(22) PCT Filed: Jul. 20, 2012

(86) PCT No.: PCT/EP2012/064317
§ 371 (c)(1),
(2), (4) Date: Jun. 11, 2014

(87) PCT Pub. No.: WO2013/060492
PCT Pub. Date: May 2, 2013

(65) Prior Publication Data
US 2014/0284381 A1    Sep. 25, 2014

(30) Foreign Application Priority Data
Oct. 28, 2011  (DE) .......................... 10 2011 085 439

(51) Int. Cl.
*G06F 17/00* (2006.01)
*G06F 17/30* (2006.01)
(Continued)

(52) U.S. Cl.
CPC ...... *G06F 17/30879* (2013.01); *G05B 19/0423* (2013.01); *G06K 19/06037* (2013.01)

(58) Field of Classification Search
CPC ..................... G05B 19/0423; G06F 17/30879; G06K 19/06037
USPC .............................. 235/375, 376, 462.01, 494
See application file for complete search history.

(56) References Cited

U.S. PATENT DOCUMENTS

| 2005/0107908 A1 | 5/2005 | Onoue et al. |
| 2010/0057900 A1* | 3/2010 | Ootsuka ........................ 709/223 |

FOREIGN PATENT DOCUMENTS

| DE | 10125336 A1 | 11/2001 |
| DE | 102006000012 A1 | 7/2006 |
| DE | 102009031865 A1 | 1/2011 |

(Continued)

OTHER PUBLICATIONS

Search Report for German Application 10 2011 085 439.8, dated Jun. 5, 2012.

(Continued)

*Primary Examiner* — Seung Lee
(74) *Attorney, Agent, or Firm* — Marshall, Gerstein & Borun LLP (57) ABSTRACT

Method for reading in a two-dimensional pattern code of a system component by a recording apparatus of a mobile device and for presenting and using data by an output apparatus includes reading in and decoding code to obtain data that are given by the code and that are related to the component on which the code is arranged; presenting the data; or adapting the data according to user data and/or the mobile device and presenting the adapted data, wherein the (adapted) data can be interactive or non-interactive. Also, a mobile device for carrying out the above method, including a recording apparatus for reading in the code, a memory, and an output apparatus for presenting the (adapted) data.

16 Claims, 5 Drawing Sheets (51) Int. Cl.
*G05B 19/042* (2006.01)
*G06K 19/06* (2006.01)

(56) References Cited

FOREIGN PATENT DOCUMENTS

| DE | 202010016090 | U1 | 5/2011 |
|---|---|---|---|
| EP | 2275986 | A1 | 1/2011 |
| JP | 2000085786 | A | 3/2000 |
| JP | 2002087533 | A | 3/2002 |
| JP | 2005197943 | A | 7/2005 |
| JP | 2006151266 | A | 6/2006 |

OTHER PUBLICATIONS

International Search Report for PCT/EP2012/064317, dated Jan. 7, 2013.

\* cited by examiner

METHOD FOR READING IN A TWO-DIMENSIONAL PATTERN CODE AND FOR REPRESENTING AND USING DATA, A MOBILE DEVICE FOR CARRYING OUT THE METHOD, AND A METHOD FOR CREATING A TWO-DIMENSIONAL PATTERN CODE

CROSS-REFERENCE TO RELATED APPLICATION

The present application is the US national phase of International Patent Application No. PCT/EP2012/064317, filed Jul. 20, 2012, which application claims priority to German Application No. 10 2011 085 439.8, filed Oct. 28, 2011. The priority application, DE 10 2011 085 439.8, is hereby incorporated by reference.

FIELD OF THE DISCLOSURE

The disclosure relates to a method for reading in a two-dimensional pattern code of a component in a system comprising different components by means of a recording device of a mobile device, and for representing and using data by means of an output device of the mobile device, to a mobile device for carrying out the method, and to a method for creating a two-dimensional pattern code which may be used for the controlling of components in a system.

BACKGROUND

Modern filling systems frequently extend over wide distances, with there being many places along the system where components of the system have to be operated, diagnosed and parameterized. In general, there is only one fixed place for an operating apparatus (iPanel) from which the system is controlled. To allow a flexible operation, i.e. to allow corresponding processes to be carried out at the individual places of the system where an operation, diagnosis and parameterization has to be realized, the use of a mobile operating and information device is desirable, thereby allowing the performance of the processes at the respective places along the filling system.

However, one problem with mobile devices is the frequently limited amount of information that can be represented and processed, which is limited, for example, by the display size, the size of the memory and the processor speed. The present disclosure, therefore, provides for the use of two-dimensional pattern codes, such as two-dimensional bar codes also being referred to as QR Codes®.

A QR Code® is able to handle any data type, e.g. numerical and alphabetical signs, symbols, binary characters and control codes. The QR Code® is formed of a quadratic matrix of black and white dots which represent the coded data in a binary way. A special marking in three of the four corners specifies the orientation, although the QR Code® may be read out in any orientation. The data in the QR Code® are protected by an error-correcting code, with a loss of code words of up to 30% being tolerated, so that a decoding of the QR Code® is possible all the same.

Document DE 20 2010 016 090 U1 discloses a route sign which is provided with an integrated QR Code® so that further updated information can be made available by means of the QR Code® since it is possible, for example, to establish a web server connection by the QR Code®, e.g. using a mobile phone with a camera function. The updated information can be represented dynamically for a respective group of persons and type of vehicle, combined or separately.

The DE 101 25 336 A1 document discloses an individual injection device including an identification pattern, which is easily readable even after the assembly of an internal combustion engine comprising this injection device. The pattern may be designed, for example, as a QR Code®, which is attached to each injection device in order to record characteristics of the injection device, and can be read outside the internal combustion engine even after the assembly of the internal combustion engine is completed. Data read out from the pattern are transmitted to an electronic control unit, and fuel injection characteristics can be adjusted on the basis of the characteristics of the individual injection device.

In document DE 10 2009 031 865 A1 it is disclosed that QR Codes® can be read by a camera of a mobile radio terminal and associated information can be represented on an output means of the mobile radio terminal. In order to make individualized information available to a customer it is possible that customer-individual information in the form of profile data are made available to a website provider. The identification data transmitted by the mobile radio terminal when the website is addressed may be used to retrieve the profile data associated with these identification data.

The JP 2000085786 A document discloses a reusable container to which a protective envelope with an identification label can be fixed. A QR Code® of the identification label is directly readable since it is disposed in an opening of the protective envelope. The QR Code® may contain, for example, information about the destination and the content of the reusable container.

The JP 2002087533 A document discloses a data carrier having a writeable portion. Recording and deleting processes are possible, and a visually identifiable information is generated. Data relating to the consignment of products may be indicated in a QR Code® attached to a transport container.

SUMMARY OF THE DISCLOSURE

The present disclosure allows a user, for example, to go with his mobile device to a required place in the system and read in by means of a camera of the mobile device a two-dimensional pattern code provided at a drive motor. The transmitted data relating to the drive motor in question may induce the mobile device to display the associated data of the drive motor, such as parameters or error messages to the user.

Thus, the present disclosure has as one aspect to provide methods and a mobile device which allow a decentralized control of a system.

A method according to the disclosure for reading in a two-dimensional pattern code of a component in a system having different components by means of a recording device of a mobile device, and for representing and using data contained in the two-dimensional pattern code by means of an output device of the mobile device includes the following steps: reading in a two-dimensional pattern code by means of a recording device of a mobile device; decoding the two-dimensional pattern code to obtain data that are given by the two-dimensional pattern code and that are related to the component on which the two-dimensional pattern code is arranged; representing the data by means of an output device of the mobile device, wherein the data can be interactive or non-interactive; or adapting the data according to user data and/or the mobile device and representing the adapted data by means of the output device of the mobile device, wherein the adapted data can be interactive or non-interactive.

The two-dimensional pattern code allows an easy access to data contained in the code, which relate to a component of the system to which the code is preferably attached, allowing a user reading out the code by means of a mobile device to recognize already prior to the decoding of the data that he will receive data, for example, that relate to the component, e.g. a drive motor, of the system. After the decoding data can directly be displayed to the user on the output device of the mobile device. The data may also be configured interactively, however, so that, when activated, the user can be displayed further data and information of the output device.

The representation of the data or of the adapted data may comprise operating parameters, current operating values, error messages and/or a time-wise operating procedure of the component.

On the basis of the represented values the user may get a quick overview whether a component of the system works as expected, whether errors have occurred which may have to be corrected, and/or what the further workload of the component looks like, for example, for another production order or for a scheduled maintenance.

The operating parameters for a drive motor of the system may comprise, for example, the speed, the beginning and the end of an operation of the drive motor. The current operating values then comprise the present speed of the drive motor, and times for the beginning and the end of the operation.

An error message of the drive motor may comprise that a limit temperature was exceeded, so that an overload and/or damage of the drive motor may occur.

A system may comprise more than 50 or 100 or 200 two-dimensional pattern codes. The two-dimensional bar codes may each be attached to individual components of the system. Also, they may be attached to components of the infrastructure of the system, e.g. air conditioners and/or emergency generators or the like.

The method may further include the step of representing a position of the component inside the system, wherein preferably also a position of a centralized operating apparatus of the system is represented.

As modern filling systems may extend over wide distances, and also over several floors, it may be useful to display to a user the position of the component he is currently working at, for example, to check the current operating values.

Moreover, in response to the activation of interactive data or of interactive adapted data, the method may include establishing a connection between the mobile device and a website and/or a centralized operating apparatus by means of a connection software.

By providing interactive data a user has the possibility to access further data and/or information. Advantageously, the data and/or information are made available on a website and/or by a centralized operating apparatus. To allow the access thereto a connection is established between the mobile device and the website and/or the centralized operating apparatus before by means of a connection software, allowing the data and/or information to be transmitted.

Furthermore, the method may include the step(s) of: ordering a maintenance order for the component of the system; and/or ordering a replacement part for the component of the system.

To guarantee a failure-free operation of a system with unscheduled failures, and in order to comply with safety requirements, a regular maintenance of the components of a system is necessary. Since owing to the maintenance the use of a component for a production process is, in general, not possible it is desirable to provide for a shortest possible interruption of the component when planning a maintenance. Thus, it may be useful to order a replacement part for the component already in advance if same is to be exchanged during the maintenance. Also, a replacement part may be ordered regardless of a maintenance, for example, if it turns out that this part is error prone and should be replaced.

The maintenance of a drive motor may comprise the inspection of a drive shaft as well as greasing the drive shaft. The necessary grease can then already be ordered in advance when the maintenance is scheduled.

In addition, the method may include the step of changing operating parameters of the component of the system.

The data represented on the output device of the mobile device may display current operating parameters of the component, and by the interactive property a user is able to input new parameters, e.g. by an input device of the mobile device, which can then be transmitted to the centralized operating apparatus on which the component programs of the individual components of the system are running. The advantage is that the user can carry out the change(s) at the location of the component and need not go to the centralized operating apparatus.

By inputting corresponding speed values it is possible to increase or reduce the speed of a drive motor and thus adapt it, for example, to a changed conveying capacity.

The method may furthermore include the loading of at least one application program which is made available by the website and/or the centralized operating apparatus. Such an application program allows, for example, the ordering of a detailed error analysis, and/or predefined time sequences of operating parameters may be made available.

The disclosure further relates to a mobile device for carrying out the above-described method, wherein the mobile device comprises a recording device for reading in a two-dimensional pattern code, a memory in which a decoding program suited for decoding the two-dimensional pattern code is stored, and an output device for representing the data or the adapted data.

The mobile device allows a user to directly read in the two-dimensional pattern codes attached to components of a system and have decoded data displayed. Thus, a user is able to be mobile in doing his work and is not limited, for example, to work at a centralized operating apparatus.

The mobile device may furthermore include an input device, advantageously a touch screen or a keyboard, wherein the memory moreover stores a software that is suited to establish a connection between the mobile device and a website and/or a centralized operating apparatus.

In addition, the mobile device may include an emergency stop device, e.g. in the form of a switch, which is designed to switch off advantageously one, more or all components of a system when activated. Upon activation of the emergency stop device the mobile device can establish a connection to the centralized operating apparatus so that the centralized operating apparatus can automatically realize a deactivation process for the one, the more or all components, for example, by performing corresponding deactivation procedures in the machine programs of the one, the more or all components.

The disclosure further relates to a method for creating a two-dimensional pattern code which may be used for the controlling of at least one component in a system, the method including the steps of: Defining at least one component to be used in a production order; defining operating parameters of the at least one defined component; defining control commands for the at least one defined component; and creating a two-dimensional pattern code whose data comprise the at least one defined component, the defined operating parameters and the defined control commands.

Creating such two-dimensional pattern codes allows a user to store, for example for a production order, all relevant data such as components required, operating parameters of the components, duration and similar data in one code. The components may be operated on the basis of the stored control commands, and a production order may be started efficiently.

The method may further include one or more of the following steps: Transmitting the two-dimensional pattern code by email to a user so that the two-dimensional pattern code can be printed and then read in; transmitting the two-dimensional pattern code to a mobile phone so that the two-dimensional pattern code can be displayed by a display of the mobile phone and read in from the display; storing the two-dimensional pattern code on a data memory.

The two-dimensional pattern code(s) can thus be created centrally, but may be used variably owing to the transmission. For example, the representation on the display of a mobile phone allows a user two receive the two-dimensional pattern code when he stands next to a component of the system. Moreover, he can read out the two-dimensional pattern code using a mobile device, so that the data contained in the two-dimensional pattern code are usable without a great delay and/or great effort.

The disclosure further relates to a method for reading in a two-dimensional pattern code of a component in a system comprising at least one component by means of a recording device of a mobile device, and for using and executing data contained in the two-dimensional pattern code, wherein the data are provided for controlling at least one process of the component, the method including the steps of: reading in a two-dimensional pattern code by means of a recording device of a mobile device; decoding the two-dimensional pattern code to obtain data that are given by the two-dimensional pattern code, that are related to the component on which the two-dimensional pattern code is arranged, and that comprise control parameters of at least one process; establishing a connection between the mobile device and a centralized operating apparatus by means of a connection software, wherein the centralized operating apparatus comprises a component software for controlling the component; in response to establishing the connection, automatically transmitting the control parameters of the at least one process to the component software of the component; and applying the control parameters of the at least one process so that operating parameters of the component are changed.

Thus, an application of control parameters is possible by reading in the two-dimensional pattern code without, for example, inputting parameter values through a user.

The control parameters for a process may comprise values for operating parameters of the components that are to be changed. By reading in the two-dimensional pattern code the control parameters can be transmitted to the component software and applied there, resulting in a change of the operating parameters.

Furthermore, after applying the control parameters, it is possible in the method to create a new two-dimensional pattern code by means of a creation software which is comprised by the component software of the component, wherein the new two-dimensional pattern code comprises information of the changed operating parameters of the component.

Thus, it is possible to perform a data saving of current operating parameters of a component by means of the two-dimensional pattern code. The information of the changed operating parameters may comprise, for example, the values of the operating parameters and the time of the change thereof. In addition, the component to which these parameters relate may be indicated.

In a further step, the created new two-dimensional pattern code may be transmitted to a data carrier for storing the new two-dimensional pattern code, and/or to a printing device, e.g. by means of remote data transmission.

BRIEF DESCRIPTION OF THE DRAWINGS

Other advantages, features and details of the disclosure are described in the following description of preferred embodiments and are shown in the drawings: In the drawings.

DETAILED DESCRIPTION OF THE PREFERRED EMBODIMENT

In the figures and the description of the figures reference is made to a QR Code®. However, this code may be replaced by any other two-dimensional pattern code or bar code. Also, it may be provided that different kinds of codes are used in one system.

Figure 1:
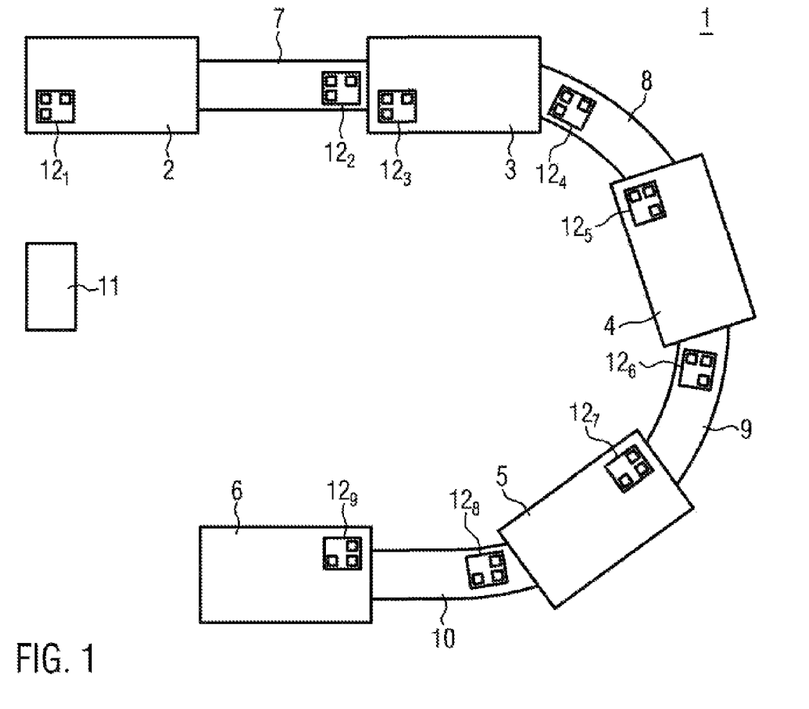
FIG. 1 shows a system whose components are provided with QR Codes®.

The system 1 schematically illustrated in FIG. 1 for the filling of containers, e.g. bottles, with products comprises a cleaning station 2 for the containers, a filling system 3, a closing system 4, a labeling system 5 and a packaging system 6. Conveyor belts 7, 8, 9, 10 serving to transport the containers are situated between the aforementioned individual components 2-6. A system 1 of this type may also comprise additional components, depending on the containers and on the products to be filled into the containers and/or depending on the requirements to be fulfilled by the system. Instead of conveyor belts, for example, also modular conveyor systems or roller conveyors or the like may be used. The individual components 2-10 of the system 1 may be controlled by a centralized operating apparatus 11 (e.g. an iPanel), where operating parameters can be inputted, changed and/or monitored, error messages can be read and errors corrected, where applicable, actual operating parameters and/or desired operating values can be read.

As is shown, the components 2-10 of the system 1 are provided with individual QR Codes® $12_1, 12_2, 12_3, 12_4, 12_5, 12_6, 12_7, 12_8, 12_9$, allowing the display of relevant data of the respective component, respectively, the access to the data and/or the display of additional information, respectively, the retrieval thereof. The QR Code® $12_1$-$12_9$ may be directly attached to a component in the form of a label, it may be arranged in a holder provided for this purpose, or the QR Code® $12_1$-$12_9$ may be represented on an electronic display attached to the component.

The relevant data may comprise operating parameters, current operating values, error messages and/or a time-wise operating procedure of the respective component 2-10. In addition, the data may indicate the position of the respective component 2-10 inside the system 1, respectively, the positional data may be retrieved. Also, the position of the centralized operating apparatus 11 inside the system 1, and thus relative to the respective component 2-10, may be indicated, respectively, retrieved.

Figure 2A:
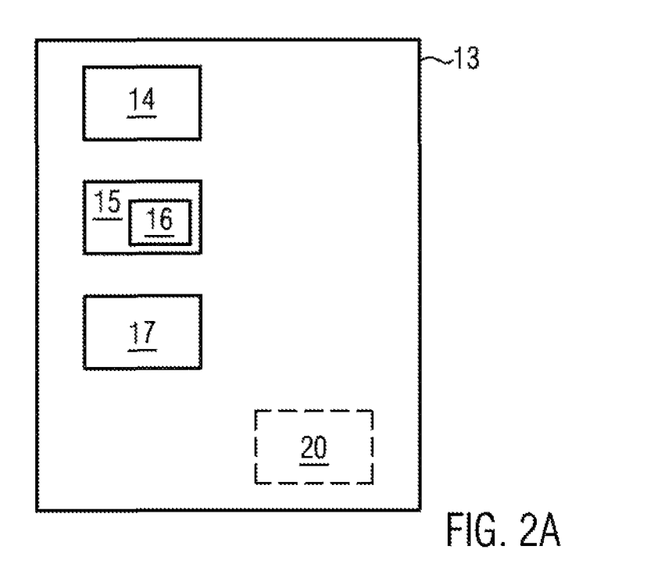
FIG. 2A shows a mobile device for representing data of a QR Code®.
Figure 2B:
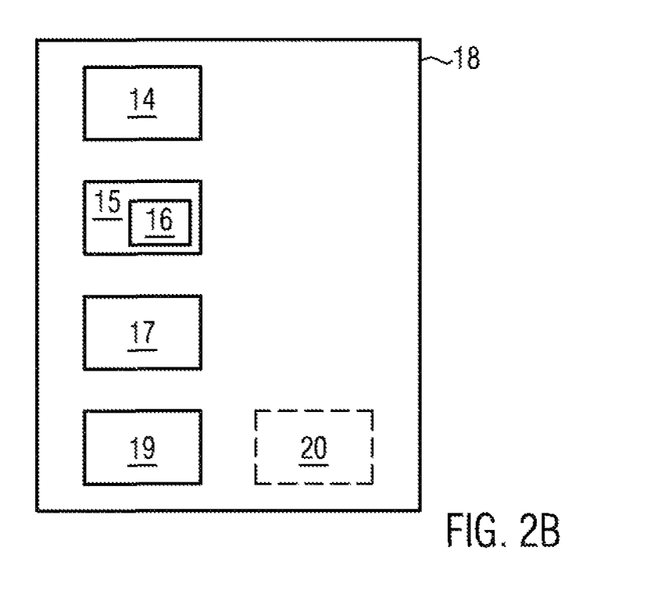
FIG. 2B shows a mobile device according to FIG. 2A, additionally comprising an input device.

A QR Code® $12_1$-$12_9$ may be read in by means of a recording device 14, e.g. a camera, of a mobile device 13, 18 and decoded by a decoding program 16 stored in a memory 15 of the mobile device 13, 18, so that the data contained in the QR Code® $12_1$-$12_9$ can be represented on an output device 17 of the mobile device 13, 18.

FIG. 2A illustrates a mobile device 13 comprising a recording device 14 for reading in a QR Code® $12_1$-$12_9$ and an output device 17 for representing the coded data of the QR Code® $12_1$-$12_9$.

The mobile device 18 illustrated in FIG. 2B furthermore comprises an input device 19 which may be provided in the form of a keyboard or touch screen. Such an input device 18 is not necessary if a mobile device 13 is to read in and decode, for example, only a QR Code® $12_1$-$12_9$, so that data can be represented by means of the output device 17. A mobile device 13 without an input device then serves to represent data, while a mobile device 18 including an input device 19 may serve to represent data (on the output device 17) and input data, e.g. control parameters, or activate represented interactive data.

A mobile device 13, 18—with or without an input device—may furthermore comprise an emergency stop device 20, e.g. in the form of a switch, which is designed to switch off advantageously one, more or all components 2-10 of the system 1. By the activation of the emergency stop device 20 the mobile device 13, 18 can establish a connection to the centralized operating apparatus 11 so that a deactivation procedure for the one, the more or all components can be performed there automatically.

Figure 3A:
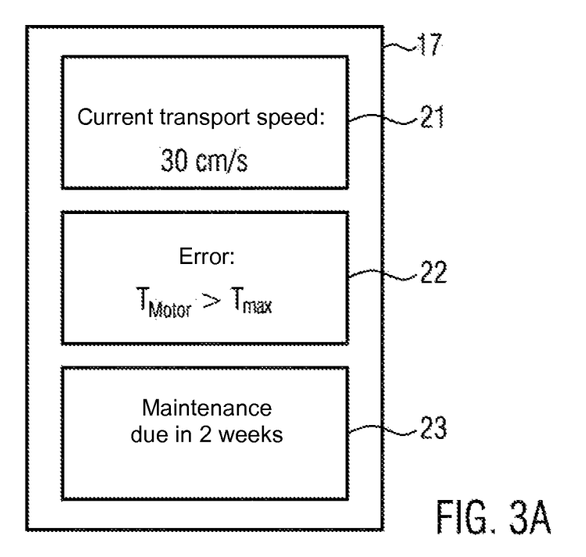
FIG. 3A shows a data representation on an output device of a mobile device without an input device.
Figure 3B:
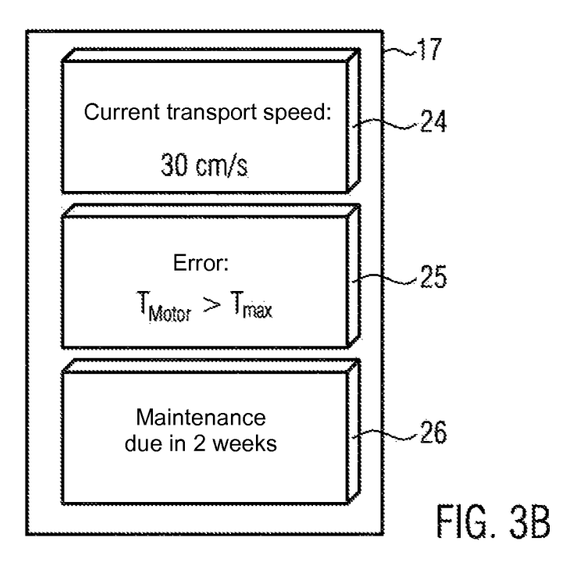
FIG. 3B shows a data representation with interactive elements on an output device of a mobile device including an input device.
Figure 3C:
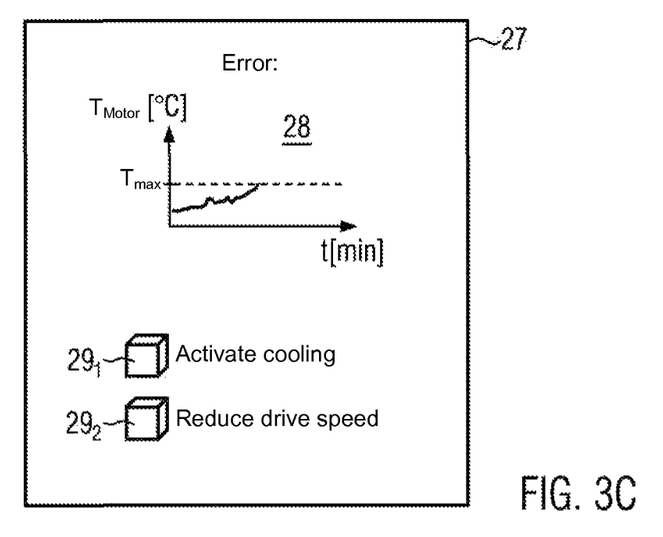
FIG. 3C shows another data representation with interactive elements on an output device of a mobile device including an input device.

FIGS. 3A to 3C show examples for different data representations on output devices 17 of different mobile devices 13, 18.

The representation of data varies for different components 2-10 of the system 1. However, the data representation for an individual component 2-10 may also vary depending on the mobile device 13, 18 used.

FIG. 3A shows the representation of data for a conveyor belt 7-10 which is driven, for example, by a motor, on the output device 17 of a mobile device 13 not having an input device, while FIG. 3B shows the representation of data for this conveyor belt 7-10 on the output device 17 of a mobile device 18 having an input device 19.

The data in FIG. 3A comprise the display of the current transport speed 21 of the conveyor belt 7-10, an error message indication 22 that the drive motor has exceeded a temperature limit $T_{max}$, and an information 23 that a maintenance is due in 2 weeks' time.

The data in FIG. 3B, too, comprise a speed indication of the current transport speed 21 of the conveyor belt 7-10, an error message indication 25 that the drive motor has exceeded a temperature limit $T_{max}$, and an information 26 that a maintenance is due in 2 weeks' time. In this case, the speed indication, the error message indication and the maintenance information are configured interactively (displayed by a schematic 3D representation), so that they may activated by using the input device 19 of the mobile device 18, e.g. by pressing an input key.

By activating the error message indication 25, as is shown in FIG. 3C, another representation 27 of data can be generated, the time-dependent temperature variation 28 of the drive motor can be displayed, and a first and a second option $29_1$, $29_2$ are displayed for removing the error. For example, an additional cooling may be activated (first option), or the drive speed may be reduced (second option). A result of selecting the second option $29_2$ may be, for example, a reduction of the drive speed, or that operating parameters of the other components 2-10 of the system 1 have to be adapted so as to allow a trouble-free operation of system 1. Advantageously, these new operating parameters are calculated automatically and then transmitted to the respective components 2-10 of system 1 so that, in case of need, the current operating parameters can be changed into the new operating parameters.

Upon activating the information 26 that a maintenance is due in 2 weeks' time a maintenance may be ordered and, for the operation of system 1, the discontinuation of component 2-10 induced by the maintenance may be communicated. If it is necessary to replace a part of the component 2-10 during the maintenance a replacement part corresponding to this part may be ordered.

In addition to a data representation that depends on the type of the mobile device the representation of the data for an individual component 2-10 may also be dependent on the respective user of the mobile device 13, 18. For example, the data displayed to a technician by the QR Code® $12_1$-$12_9$ may comprise technical detail specifications and operating parameters of the component 2-10, while the data displayed to a user who wants to check a production order can indicate the continuation of the production at component 2-10.

A mobile device 13, 18 also allows to read in QR Codes® which, when read in, for example without the input of parameters, directly result in an execution of control commands, such as changes of machine and/or type parameters. It is also possible, however, to start the activation of the execution of the control commands by executing a corresponding activation command.

Such QR Code®, which lead to an execution of control commands, can be created (regardless of the components of the system) and transmitted, for example, directly in an email to a user or by means of an MMS to a mobile phone of a user. Thus, the QR Code® can be printed and read in, or read in from the mobile phone display. It is also possible, however, to send the creation data of the QR Code to the user, allowing the user to generate the QR Code® by himself using a QR Code® creation software, and print it afterwards.

Moreover, it is possible to create a QR Code® which contains data that control the implementation of a production order. The QR Code® contains, for example, all types that have to be loaded to start the production order. This QR Code® can be read in, for example centralized or individually at each machine, so as to load the necessary types.

Figure 4:
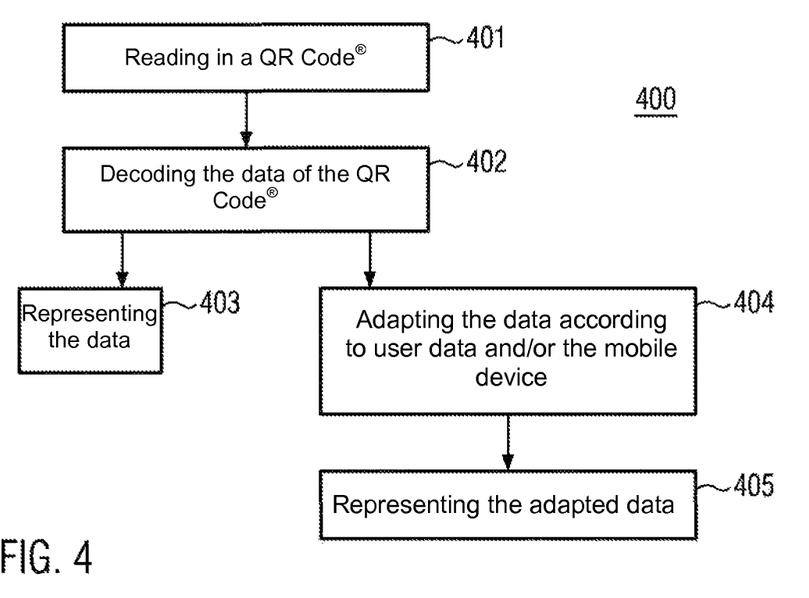
FIG. 4 shows a flow diagram for a method for reading in a QR Code®, and for representing (adapted) data.

FIG. 4 shows a flow diagram of a method 400 according to the disclosure. In step 401, the recording device 14 of a mobile device 13, 18 can read in a QR Code® $12_1$-$12_9$ which, in step 402, may then be decoded by a decoding software 16, which may be stored in a memory 15 of the mobile device 13, 18. In step 403, the decoded data may be displayed on an output device 17 of the mobile device 13, 18.

Before the decoded data are represented on the output device 17, moreover, an adaptation of the decoded data according to user data and/or the mobile device 13, 18 used may be realized in step 404. User data can be identified by reading in a user identification of a company ID card by means of the recording device 14. The user data can give information whether the user is a technician to whom the technical detail specifications and operating parameters of components 2-10 of the system 1 are relevant, or whether the user is a user having the task of checking the production orders to whom the progress of the production steps of the components 2-10 of the system 1 is of relevance.

The decoded data can be adapted corresponding to the device 13, 18 used. If the mobile device 18 includes an input device 19, interactive data can be activated by means of the input device 19, so that a corresponding indication is desirable (e.g. by a schematic 3D representation as shown in FIGS. 3B and 3C) allowing a user of the mobile device 18 to recognize the interactive feature. The mobile device 18 allows the interactivity, for example upon activation (e.g. triggered by pressing an input key of the input device 19), by establishing a connection to a website on which operating programs of one or more components 2-10 of the system 1 can be retrieved. The user can then change parameters and/or retrieve further details about the operation of a component 2-10 by means of the input device 19.

If the mobile device 13 used does not comprise an input device the user is unable to actively access interactive data by activation, so that a corresponding indication is not necessary and the data can be represented in an easy manner, i.e. for example without an interactivity information.

To adapt the decoded data according to user data and/or the mobile device 13, 18 used a processing program may be stored in the memory 15 of the mobile device 13, 18, which can be executed by a processor of the mobile device 13, 18 and by means of which data can be selected from the decoded data which correspond to the user data and/or the mobile device 13, 18 used.

Upon an adaptation of the data, the adapted data can be represented on an output device 17 of the mobile device 13, 18 in step 405.

Figure 5:
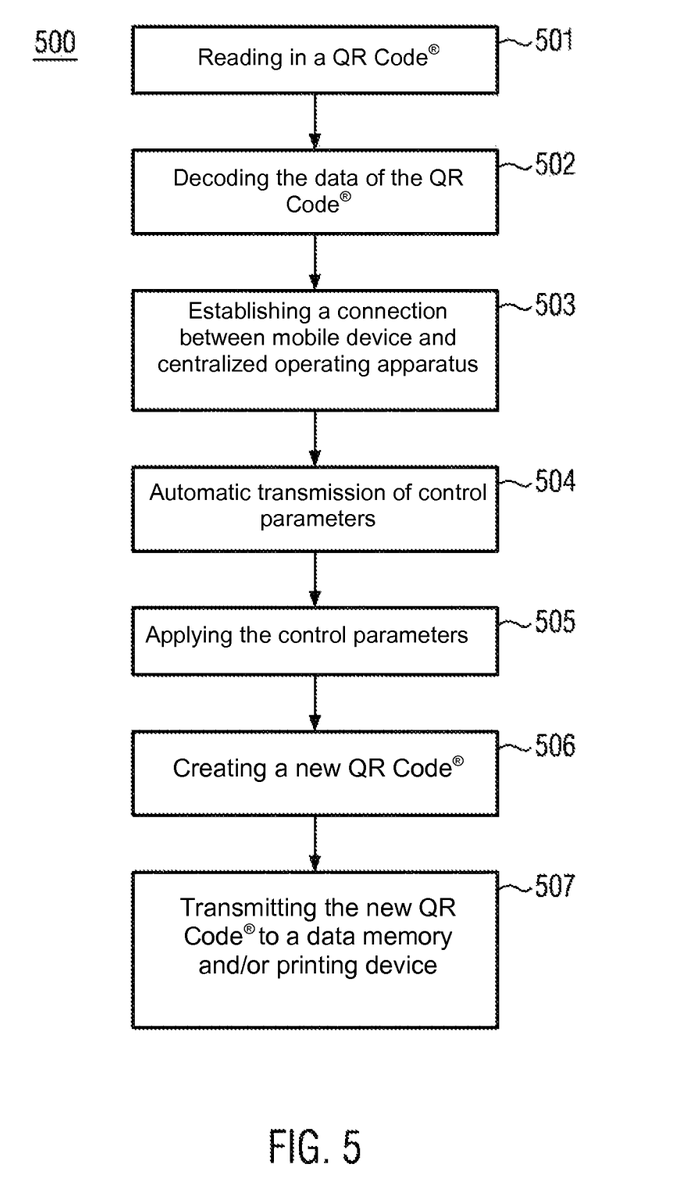
FIG. 5 shows a flow diagram for a method for reading in a QR Code®.

FIG. 5 illustrates a flow diagram for a method 500 according to the disclosure for reading in a QR Code® $12_1$-$12_9$ of a component 2-10 in a system 1 comprising at least one component 2-10 by means of a recording device 14 of a mobile device 13, 18, and for using and executing data contained in the QR Code® $12_1$-$12_9$, the data being provided for controlling at least one process of the component 2-20. Optionally, it is also possible to create a new QR Code® $12_1$-$12_9$ in steps 506 and 507 and transmit it to a data memory and/or printing device.

The data for the controlling may comprise, for example, values for operating parameters of a drive motor, for example of a conveyor belt. Before reading in the QR Code® $12_1$-$12_9$ this drive motor is in a first operating state, i.e. it is operated on the basis of set first operating parameters. The data contained in the QR Code® $12_1$-$12_9$ then make second operating parameters available after the reading in and decoding. For the operation of the drive motor this may require, for example, a definition of four operating parameters, i.e. if the drive motor is in the first operating state four first operating parameters are available. The values of the second operating parameters may be different for one, two, three or four values of the first operating parameters.

In step 501, first the QR Code® $12_1$-$12_9$ is read in, e.g. by means of a recording device 14 of a mobile device 13, 18.

In step 502, the QR Code $12_1$-$12_9$ is decoded by means of a decoding software 16 which may be stored in a memory 15 of the mobile device 13, 18. Thus, the data stored in the QR Code® $12_1$-$12_9$ are available for further applications.

In step 503, a connection is established between the mobile device 13, 18 and a centralized operating apparatus 11 allowing data to be transmitted between the mobile device 13, 18 and the centralized operating apparatus 11. The connection may be a wireless connection. Preferably, the centralized operating apparatus 11 is configured such that even several mobile devices 13, 18 can establish a connection to it. In addition, the centralized operating apparatus 11 can comprise, for example in a storage medium, a component software for controlling the component 2-10. Preferably, a suitable component software is respectively stored for all components 2-10 of the system 1. The component software allows controlling the operation of the component 2-10, for example by reading in and/or inputting values for operating parameters.

Upon establishing the connection an automatic transmission of control parameters of the at least one process, which are stored in the data of the QR Code® $12_1$-$12_9$, to the component software of the component 2-10 takes place in step 504, so that the control parameters can be used by the component software.

In step 505, the transmitted control parameters are then applied, so that operating parameters of the component 2-10 can be changed.

Upon changing the operating parameters of the component 2-10 the new, changed operating parameters, on the basis of which the component 2-10 is then operated, can then optionally be stored in a QR Code® $12_1$-$12_9$, so that an efficient data storage may be achieved.

In step 506, upon applying the control parameters, a new QR Code® $12_1$-$12_9$ is created by means of a creation software which is comprised by the component software of the component 2-10, the new QR Code® $12_1$-$12_9$ comprising information about the changed operating parameters of the component 2-10. In step 507, the QR Code® $12_1$-$12_9$ is transmitted to a data carrier for storage thereof and/or to a printing device.

The invention claimed is:

1. A method for reading in a two-dimensional pattern code of a component in a system having a plurality of components by means of a recording device of a mobile device, and for representing and using data contained in the two-dimensional pattern code by means of an output device of the mobile device, comprising:
    reading in a two-dimensional pattern code by means of a recording device of a mobile device;
    decoding the two-dimensional pattern code to obtain data that are given by the two-dimensional pattern code and that are related to a component on which the two-dimensional pattern code is arranged; and
    representing the data by means of an output device of the mobile device, and the data being one of interactive or non-interactive; or
    adapting the data according to at least one of user data or the mobile device and representing the adapted data by means of the output device of the mobile device, and the adapted data being one of interactive or non-interactive; and further comprising:
    in response to activation of interactive data or of interactive adapted data by a user, establishing a connection between the mobile device and a website and/or a centralized operating apparatus by means of a connection software; and
    ordering a maintenance order for the component of the system by the user, and/or ordering a replacement part for the component of the system by the user.

2. The method according to claim 1, and the representation of the data or of the adapted data comprises operating parameters, current operating values, error messages and/or a timewise operating procedure of the component.

3. The method according to claim 1, and further comprising:
    representing a position of the component inside the system.

4. The method according to claim 3, and representing a position of the centralized operating apparatus of the system.

5. The method according to claim 1, and further comprising:
changing operating parameters of component of the system, and the change of the operating parameters is realized by an input by the user, or automatically in response to establishing a connection between the mobile device and the website and/or the centralized operating apparatus.

6. The method according to claim 1, and further comprising:
loading at least one application program which is made available by the website and/or the centralized operating apparatus.

7. The method according to claim 6, wherein the loading is realized by an input by the user, or automatically in response to establishing the connection between the mobile device and the website and/or the centralized operating apparatus.

8. The method according to claim 6, and the application program comprises means for an error analysis of a component of the system and/or means for representing predefined time sequences of operating parameters of the component of the system.

9. A mobile device for performing the method according to claim 1, the mobile device comprising:
a recording device for reading in a two-dimensional pattern code;
a memory in which a decoding program suited for decoding the two-dimensional pattern code is stored;
an output device for representing the data or the adapted data; and
an emergency stop device which is designed to switch off one component, a plurality of components or all components of a system when activated.

10. The mobile device according to claim 9, further comprising an input device, and the memory stores a software that is suited to establish a connection between the mobile device and a website and/or a centralized operating apparatus.

11. The mobile device according to claim 10, and the input device comprises a touch screen or a keyboard.

12. The method for creating a two-dimensional pattern code which may be used for a controlling of at least one component in a system, comprising:
defining at least one component to be used in a production order;
defining operating parameters of the at least one defined component;
defining control commands for the at least one defined component; and
creating a two-dimensional pattern code whose data comprise the at least one defined component, the defined operating parameters and the defined control commands.

13. The method according to claim 12, and further comprising one or more of:
transmitting the two-dimensional pattern code by email to a user so that the two-dimensional pattern code can be printed and then read in;
transmitting the two-dimensional pattern code to a mobile phone so that the two-dimensional pattern code can be displayed on a display of the mobile phone and read in from the display; and
storing the two-dimensional pattern code on a data memory.

14. A method for reading in a two-dimensional pattern code of a component in a system having at least one component by means of a recording device of a mobile device, and for using and executing data contained in the two-dimensional pattern code and the data are provided for controlling at least one process of the component comprising:
reading in a two-dimensional pattern code by means of a recording device of a mobile device;
decoding the two-dimensional pattern code to obtain data that are given by the two-dimensional pattern code, that are related to the component on which the two-dimensional pattern code is arranged, and that comprise control parameters of at least one process;
establishing a connection between the mobile device and a centralized operating apparatus by means of a connection software, and the centralized operating apparatus comprises a component software for controlling the component;
in response to establishing the connection, automatically transmitting the control parameters of the at least one process to the component software of the component; and
applying the control parameters of the at least one process so that operating parameters of the component are changed.

15. The method according to claim 14, and further comprising:
after applying the control parameters, creating a new two-dimensional pattern code by means of a creation software which is comprised by the component software of the component, and the new two-dimensional pattern code including information of the changed operating parameters of the component.

16. The method according to claim 15, and further comprising:
transmitting the new two-dimensional pattern code to a data memory for storing the new two-dimensional pattern code; and/or
transmitting the new two-dimensional pattern code to a printing device.

* * * * *